March 25, 1958

D. L. ERET 2,828,074

SPEED-RESPONSIVE ODOMETER

Filed Feb. 5, 1957

INVENTOR.
DONALD L. ERET
BY
McMorrow, Berman & Davidson
ATTORNEYS

March 25, 1958     D. L. ERET     2,828,074
SPEED-RESPONSIVE ODOMETER
Filed Feb. 5, 1957     2 Sheets-Sheet 2
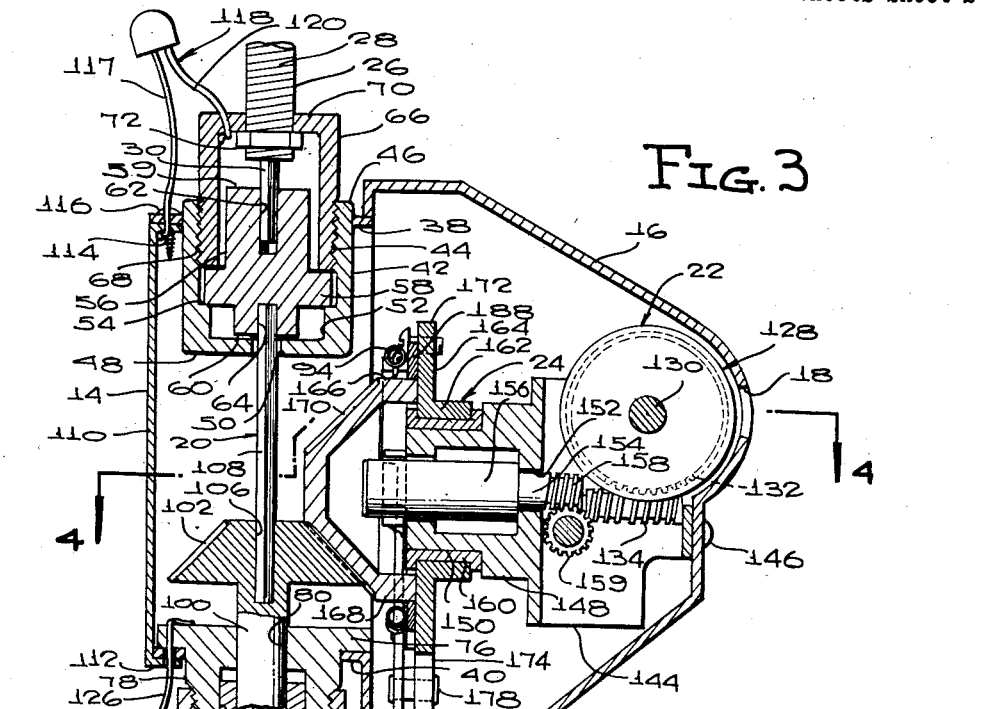
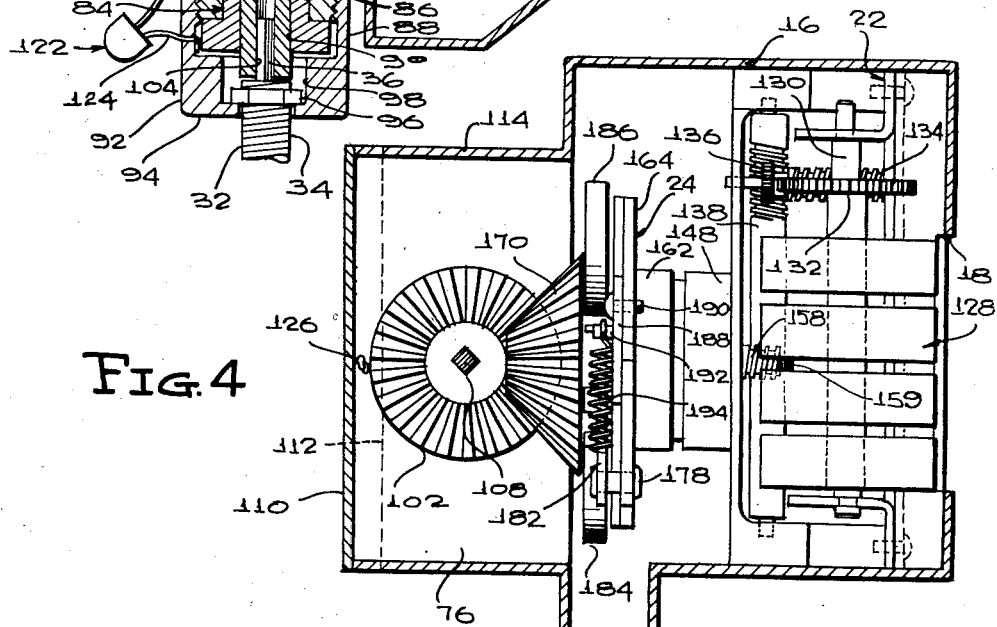
INVENTOR.
DONALD L. ERET
BY
McMorrow, Berman & Davidson
ATTORNEYS United States Patent Office 2,828,074
Patented Mar. 25, 1958

2,828,074

SPEED-RESPONSIVE ODOMETER

Donald L. Eret, Huntsville, Ala.

Application February 5, 1957, Serial No. 638,288

3 Claims. (Cl. 235—95)

This invention relates generally to vehicle attachments, and is more particularly concerned with a novel speed-responsive odometer interpositionable between a speedometer drive shaft and speedometer for registering distances travelled above a predetermined speed.

Conventional speedometers generally incorporate an odometer assembly for registering the distance travelled by a vehicle. However, the various distances travelled at a speed in excess of a predetermined maximum speed have heretofore not been registered. A record of distance travelled above a predetermined maximum speed is especially usable, for example, by insurance companies whereby a vehicle owner who constantly drives the vehicle below the predetermined maximum speed might be afforded a preferred insurance rate, law enforcement agencies upon finding an individual who chronically travels above a maximum speed would have some basis for revoking the privilege of driving a vehicle, the speed-responsive odometer affording means for monitoring the distances a vehicle travels over a predetermined maximum speed, individuals such as truck drivers, taxi cab drivers and the like could be discouraged from driving their vehicles at an excessive speed, and finally parents who permit individuals to use the family car, for example, would have means for discouraging those individuals from driving at excessive speeds.

A primary object of invention, in conformance with that set forth, is to provide a speed-responsive odometer including means operatively connectible between a drive shaft of a speedometer and a driven speedometer assembly, said speed-responsive odometer including an odometer assembly including a registering portion, and further including a speed-responsive clutch assembly including means for rendering the same inactive at speeds below a predetermined value, and further including means for activating the speed-clutch assembly at speeds above a predetermined value wherein the speed-clutch assembly is operatively engaged with an operating shaft of the odometer assembly accordingly activating the same at speeds above a predetermined value providing a record of the distances travelled at speeds above a predetermined value.

A further object of invention in conformance with that set forth is to provide an improved speed-responsive odometer of the character set forth which is readily and economically manufactured, easily installed, and highly satisfactory and practical for the purpose intended.

These together with other objects and advantages which will subsequently become apparent reside in the details of construction and operation as more fully hereinafter described and claimed, reference being had to the accompanying drawing forming a part thereof, wherein like numerals refer to like parts throughout, and in which:

Figure 3 is a vertical section taken substantially on the plane of line 3—3 of Figure 1; and Figure 4 is a horizontal section taken substantially on the plane of line 4—4 of Figure 3.

Figure 1:
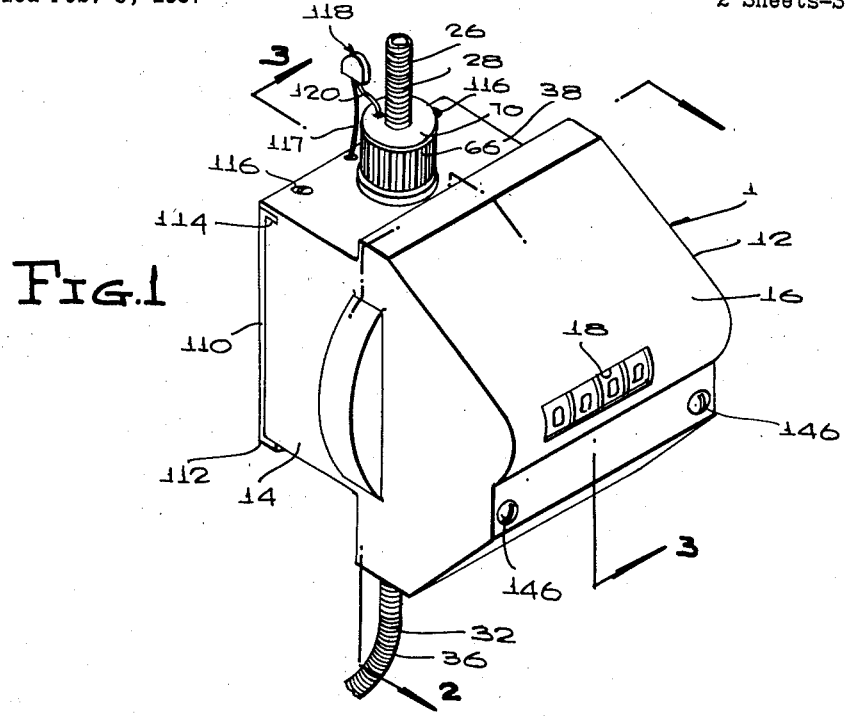
Figure 1 is a perspective view of the speed-responsive odometer.

Referring to the drawing in detail, indicated generally at 10 is a speed-responsive odometer including a housing member 12, which is hollow and constructed of any suitable material, including a rectangularly conformed rear end portion 14 integral with a triangularly shaped converging forward portion 16. The portion 16 has extending transversely therethrough an elongated sight opening 18. Contained within the housing member 12 and to subsequently be described in detail, is a drive assembly indicated generally at 20, a registering odometer assembly indicated generally at 22 and a speed-responsive clutch assembly indicated generally at 24.

A fragmentary portion of a conventional speedometer drive shaft is indicated at 26 including the usual flexible conduit 28 surrounding a drive shaft 30 having a polygonal cross section. Indicated at 32 is a fragmentary portion of a drive shaft which will be operatively connected to a speedometer assembly (not shown). The drive shaft 32 incorporates a flexible conduit 34 having circumposed therein a shaft 36 having a polygonal cross section. The upper and lower walls 38 and 40 of the rectangularly conformed portion of the housing member have extending therethrough aligned transverse apertures. The wall 38 has suitably secured in the transverse aperture therethrough an upwardly opening suitably secured support sleeve 42 incorporating a threaded portion 44 on the inner periphery thereof adjacent its open upper end 46. The sleeve 42, if preferred, has extending transversely across the bottom an integral wall 48 incorporating a central transverse aperture therethrough as indicated at 50. Extending about the inner periphery of the tubular support sleeve 42 adjacent the lower end thereof is an annular support rib 52 providing a support shoulder 54. A coupling block having a cylindrical configuration extends longitudinally within the sleeve 42, said block being indicated at 56 and including an intermediate annular flange portion 58, the lower surface of which resting on the shoulder 54 of the sleeve 42. The element 56 has extending longitudinally therein and opening into the respective upper and lower ends 59 and 60 thereof, blind bore portions 62 and 64, respectively, having a polygonal cross section, conforming to the outer periphery of the drive shaft 30 previously mentioned. The terminal end of the drive shaft 30 is reciprocably received within the bore portion 62, see Figure 3. An annular retaining cap 66 incorporates an externally threaded outer peripheral portion 68 removably received on the threaded portion 44 of element 42. The retaining cap 66 incorporates a transverse upper end wall 70 centrally apertured for receiving therethrough the conduit 28, said conduit being retained in substantially fixed relationship thereon by means of a suitable clamp nut 72. Accordingly, rotation of the shaft 30 will cause similar rotation of the coupling element 56.

The bottom wall 40 has juxtaposed on the inner surface thereof a rectangularly conformed support plate 76 incorporating an integral downwardly extending externally threaded tubular support portion 78 extending through the apertured bottom wall 40, said support plate 76 being suitably secured to the lower wall 40 in any suitable manner. The plate 76 is transversely apertured at 80 providing a longitudinally opening bore portion in coaxial relationship relative to an annular recess 82 in the sleeve 78. A connecting element 84 incorporates a tubular sleeve 86 received within the recess 82, and terminating at its lower end in an annular flange 88 engaged with the lower edge of sleeve 78. The connecting element 84 incorporates longitudinally therethrough and opening into its lower end a bore portion 90 in co-axial relationship to the bore portion 80 through the plate 76. A cylindrical retaining cap 92 is received on the lower externally threaded end of sleeve 78, incorporating a transverse bottom wall 94 centrally apertured for receiving therethrough the conduit 34 of the drive shaft to the speedometer assembly. A suitable retaining nut 96 is disposed within a recess 98 in cap 92, for retaining the speedometer drive shaft in a relatively fixed position on the retaining cap 92. The aligned bore portions 80 and 90 of the elements 78 and 84, respectively, have extending therethrough an elongated support shaft 100 integral with a transverse bevel drive gear 102. Opening axially from the lower end of the shaft 100 is a blind bore portion 104 suitably conformed for receiving therein the polygonally cross sectioned drive shaft 36 for driving a speedometer assembly. The bevel drive gear 102 incorporates through its upper end a suitably conformed blind bore portion 106 in axial alignment with the bore portion 64 of the coupling element 56 and received in said aligned bore portions is a suitable drive shaft 108 having a polygonal cross section conforming to the aligned bore portions.

A removable cover plate 110 incorporates a lower transverse flange portion 112 underlying the rear under surface portion of the bottom wall 40 of the housing member. The cover plate 110 incorporates transversely of its upper edge a flange 114 underlying the rear edge of the top wall 38 of the housing member. Suitable fastening elements such as machine screws 116 are provided for retaining the cover plate 110 on the housing member. The cover plate 110 when removed, will permit access to the interior of the housing member 12 for the purpose of adjusting the speed-responsive clutch assembly 24, however, after said assembly has been adjusted, the cover plate 110 has extending through a suitable aperture in the flange 114 thereof a suitably secured flexible wire 117 of a frangible seal indicated generally at 118, said frangible seal 118 incorporating a second wire 120 suitably secured through the cap element 66. A second frangible seal 122 incorporates wire legs 124 and 126, the wire 124 extending through the cap element 92, and the wire leg 126 extending through the flange 112 of plate 76. Accordingly, the frangible seals 118 and 122 will prohibit tampering with the operating mechanism of the speed-responsive odometer.

The odometer assembly 22 is of a substantially conventional character, including a plurality of progressively driven registering wheels indicated generally at 128, the indicating portions thereof being visible through the slot or aperture 18 of the housing member 12. The registering wheels 128 are journalled on a suitable support shaft extending transversely in rearwardly spaced relation from the forward wall of the housing member. Said support shaft as indicated at 130 incorporating an intermediate driven gear 132 interengaged with the suitably supported underlying worm gear 134. The worm gear 134 incorporates on the support shaft thereof a driven gear 136 intermeshed with a transverse suitably journaled driven worm gear 138. The aforementioned structure is carried on a suitable support member 144 retained in a fixed position in the housing member 12 by means of suitable fastening elements 146 which extend through the forward surface of the housing member as seen in Figures 1 and 3, for example. The support member 144 incorporates a rearwardly projecting annular sleeve 148 having a reduced diameter annular portion 150. The sleeve 148 has extending longitudinally therethrough an aperture portion 152 which has journaled therein a reduced diametered portion 154 of an operating shaft 156. The reduced diametered portion 154 includes on the forward end thereof a suitable drive worm 158 driving a gear 159 extending about an intermediate portion of a driven worm gear 138, and accordingly as the operating shaft 156 rotates, the registering wheels of the odometer assembly will be progressively rotated. The operating shaft 156 extends normal to the longitudinal axis of the shaft 108 which will be rotated by the speedometer drive shaft, and terminates short thereof, see Figure 3.

The reduced diameter portion 150 of sleeve 148 has journaled thereon suitable support collar 160 receiving thereon a suitably journaled sleeve 162 for the support plate 164. Said support plate comprises a portion of the speed-responsive clutch assembly 24. The support plate 164 has extending integrally from the rear surface thereof support portions 166 and 168 integral with a hollow bevel driven-gear 170 drivingly engaged with the bevel drive-gear 102, the driven gear 170 being concentrically disposed relative to the longitudinal axis, or axis of rotation, of the operating shaft 156. Accordingly, when the bevel drive-gear 102 is rotated the bevel gear 170 will also be rotated, these gears being of a one-to-one ratio, and accordingly the support plate 164 will be rotated about the longitudinal axis of the operating shaft 156.

Figure 2:
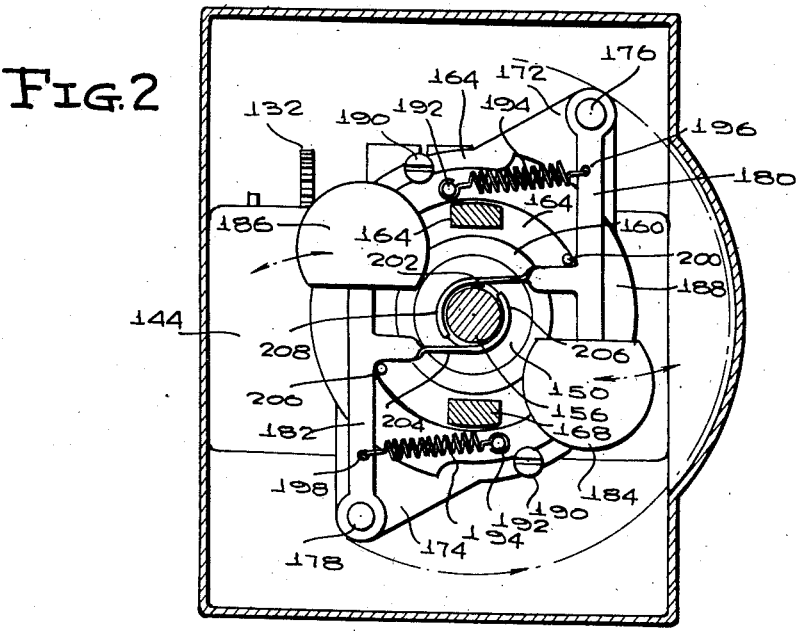
Figure 2 is a vertical section taken substantially on the plane of line 2—2 of Figure 1.

As most clearly seen in Figure 2, the support plate 164 has extending diametrically thereof in offset relationship relative to its longitudinal axis of rotation a pair of radially projecting support portions 172 and 174 having extending transversely therethrough suitable support or pivot pin elements 176 and 178, respectively, which have suitably journaled thereon one end of elongated governor-weight levers 180 and 182, respectively, said levers 180 and 182 having secured on the terminal end thereof suitable governor-weights 184 and 186, respectively. As the support plate 164 is rotated the weights 184 and 186 will be urged due to centrifugal motion outwardly away from the axis of rotation of the support plate 164 as indicated by the arcuate dotted direction arrows in Figure 2. An annular support ring 188 is juxtaposed on the rear surface of the support plate 164 being adjustably retained thereon by means of suitable retaining screws 190 which have an enlarged head portion which overlies one side of said ring 188. The ring 188 has extending normal to its rear surface diametrically opposed support pins 192 to which are suitably secured one end of suitable tension springs 194, the other end of said tension springs extending through apertures 196 and 198 of the respective governor-weight levers 180 and 182. The springs 194 will tend to resist the tendency of the weights 184 and 186 to move outwardly away from the axis of rotation of the support plate 164, and by loosening the screws 190 the tension of the springs 194 may be adjusted. Suitable abutment pins 200 extend rearwardly from the support plate 164 for limiting movement of the levers 180 and 182 toward the center of the support plate 164 when the same is not being rotated. Each of the levers 180 and 182 have extending normal from an intermediate portion thereof suitably conformed strap elements 202 and 204, respectively, which are disposed on opposite sides of the odometer operating shaft 156, and incorporating inwardly turned terminal end portions 206 and 208, respectively, which may be of an arcuate character to conform with the outer periphery of the operating shaft 156, and after the tension of the springs 194 is overcome due to the centrifugal motion or force on the governor-weights 184 and 186, the portions or ends 206 and 208 will frictionally engage the outer surface of the operating shaft 156, and when this occurs the shaft 156 will be rotated accordingly operating the odometer assembly and rotating the registering wheels 128 thereof. The tension springs 194 will be so adjusted to correspond to a maximum speed, for example, sixty miles per hour, and will not permit rotation of the odometer operating shaft at speeds below this value. However, if the speed of sixty miles per hour, for example, is exceeded, the shaft 156 will be rotated and those distances travelled at a speed above sixty miles per hour will be recorded on the odometer assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A speed-responsive odometer for indicating distance travelled above a predetermined speed comprising a housing, a driven shaft journalled transversely of the housing including connecting means at opposite ends for interposition between a speedometer drive shaft and a driven speedometer, an odometer assembly in said housing including a registering portion, said odometer assembly including an operating shaft extending normal to the driven shaft and terminating short thereof, and an adjustable speed-responsive clutch assembly operatively engaged between the driven and operating shafts for activating the odometer assembly, said clutch assembly comprising a support sleeve circumposed about an intermediate portion of the odometer operating shaft, a support plate journalled on an intermediate portion of the support sleeve, a bevel drive-gear disposed in circumposed relationship about an intermediate portion of the drive shaft, a bevel driven-gear secured on the support plate concentrically of the longitudinal axis of the support sleeve in driving engagement with the bevel drive-gear, a pair of governor-weight levers pivotally supported at one end on the support plate in equidistant diametrically opposed relation on opposite sides of the axis of rotation of the bevel driven-gear and in parallel relationship thereto, said levers including similar weights on terminal ends thereof whereby rotation of the support plate tends to pivot the levers about said one end away from the axis of rotation of the support plate, tension springs extending from an intermediate portion of the levers in anchored relation on the support plate urging the levers toward the axis of rotation of the bevel driven-gear, each of said governor-weight levers including strap elements extending normal from an intermediate portion thereof in intersecting relation with the odometer operating shaft and on opposite sides thereof, said strap elements including inwardly turned friction portions extending toward each other on opposite sides of the operating shaft for engaging the opposite sides of the same in response to rotation of the support plate at a speed sufficient to overcome the force of the tension springs for rotating the odometer operating shaft.

2. A speed-responsive odometer for indicating distance travelled above a predetermined speed comprising a housing, a driven shaft journalled transversely of the housing including connecting means at opposite ends for interposition between a speedometer drive shaft and a driven speedometer, an odometer assembly in said housing including a registering portion, said odometer assembly including an operating shaft extending normal to the driven shaft and terminating short thereof, and an adjustable speed-responsive clutch assembly operatively engaged between the driven and operating shafts for activating the odometer assembly, said clutch assembly comprising a support sleeve circumposed about an intermediate portion of the odometer operating shaft, a support plate journalled on an intermediate portion of the support sleeve, a bevel drive-gear disposed in circumposed relationship about an intermediate portion of the drive shaft, a bevel driven-gear secured on the support plate concentrically of the longitudinal axis of the support sleeve in driving engagement with the bevel drive-gear, a pair of governor-weight levers pivotally supported at one end on the support plate in equidistant diametrically opposed relation on opposite sides of the axis of rotation of the bevel driven-gear and in parallel relationship thereto, said levers including similar weights on terminal ends thereof whereby rotation of the support plate tends to pivot the levers about said one end away from the axis of rotation of the support plate, tension springs extending from an intermediate portion of the levers in anchored relation on the support plate urging the levers toward the axis of rotation of the bevel driven-gear, each of said governor-weight levers including strap elements extending normal from an intermediate portion thereof in intersecting relation with the odometer operating shaft and on opposite sides thereof, said strap elements including inwardly turned friction portions extending toward each other on opposite sides of the operating shaft for engaging the opposite sides of the same in response to rotation of the support plate at a speed sufficient to overcome the force of the tension springs for rotating the odometer operating shaft, said clutch assembly including means for adjusting the tension imposed by the tension springs on the governor-weight levers necessitating a predetermined speed of rotation of the support plate before the operating shaft of the odometer assembly is rotated.

3. A speed-responsive odometer for indicating distance travelled above a predetermined speed comprising a housing, a driven shaft journalled transversely of the housing including connecting means at opposite ends for interposition between a speedometer drive shaft and a driven speedometer, an odometer assembly in said housing including a registering portion, said odometer assembly including an operating shaft extending normal to the driven shaft and terminating short thereof, and an adjustable speed-responsive clutch assembly operatively engaged between the driven and operating shafts for activating the odometer assembly, said clutch assembly comprising a support sleeve circumposed about an intermediate portion of the odometer operating shaft, a support plate journalled on an intermediate portion of the support sleeve, a bevel drive-gear disposed in circumposed relationship about an intermediate portion of the drive shaft, a bevel driven-gear secured on the support plate concentrically of the longitudinal axis of the support sleeve in driving engagement with the bevel drive-gear, a pair of governor-weight levers pivotally supported at one end on the support plate in equidistant diametrically opposed relation on opposite sides of the axis of rotation of the bevel driven-gear and in parallel relationship thereto, said levers including similar weights on terminal ends thereof whereby rotation of the support plate tends to pivot the levers about said one end away from the axis of rotation of the support plate, tension springs extending from an intermediate portion of the levers in anchored relation on the support plate urging the levers toward the axis of rotation of the bevel driven-gear, each of said governor-weight levers including strap elements extending normal from an intermediate portion thereof in intersecting relation with the odometer operating shaft and on opposite sides thereof, said strap elements including inwardly turned friction portions extending toward each other on opposite sides of the operating shaft for engaging the opposite sides of the same in response to rotation of the support plate at a speed sufficient to overcome the force of the tension springs for rotating the odometer operating shaft, said housing including frangible seal means engaged with the connecting means of the driven shaft for obviating tampering with the connections between the speedometer drive and driven shafts.

References Cited in the file of this patent

UNITED STATES PATENTS

| | | |
|---|---|---|
| 1,209,608 | Moeller et al. | Dec. 19, 1916 |
| 2,193,388 | Blue | Mar. 12, 1940 |
| 2,334,523 | Welch | Nov. 16, 1943 |

FOREIGN PATENTS

| | | |
|---|---|---|
| 172,190 | Great Britain | Dec. 8, 1921 |